FIG. 2

INVENTORS
CARL H. BOETCKER
ROBERT P. HERZOG
ROBERT S. CARLSON
ELDRIDGE H. SMILEY
FRED K. STORM
JAMES H. SCOTT

FIG. 3

INVENTORS
CARL H. BOETCKER
ROBERT P. HERZOG
ROBERT S. CARLSON
ELDRIDGE H. SMILEY
FRED K. STORM
JAMES H. SCOTT

Oct. 25, 1966

E. H. SMILEY ETAL 3,281,141

SURGICAL TABLE

Filed Jan. 15, 1963

INVENTORS
CARL H. BOETCKER
ROBERT P. HERZOG
ROBERT S. CARLSON
ELDRIDGE H. SMILEY
FRED K. STORM
JAMES H. SCOTT

INVENTORS
CARL H. BOETCKER
ROBERT P. HERZOG
ROBERT S. CARLSON
ELDRIDGE H. SMILEY
FRED K. STORM
JAMES H. SCOTT

INVENTORS
CARL H. BOETCKER
ROBERT P. HERZOG
ROBERT S. CARLSON
ELDRIDGE H. SMILEY
FRED K. STORM
JAMES H. SCOTT

United States Patent Office 3,281,141
Patented Oct. 25, 1966

3,281,141
SURGICAL TABLE
Eldridge H. Smiley, Rosemead, and Fred K. Storm, Glendale, Calif., Carl H. Boetcker, Lake City, and Robert P. Herzog, Erie, Pa., Robert S. Carlson, Maeggre Scorre, Knokke-le-Zoute, Belgium, and James H. Scott, Los Angeles, Calif.; said Smiley, said Storm, said Boetcker, said Herzog, and said Carlson assignors to American Sterilizer Company, Erie, Pa., a corporation of Pennsylvania
Filed Jan. 15, 1963, Ser. No. 259,800
24 Claims. (Cl. 269—325)
(Filed under Rule 47(a) and 35 U.S.C. 116)

This invention relates to surgical or operating tables.

Surgical operating tables as now made are provided with a plurality of sections such as head, back, seat, and leg sections which can be adjusted to various positions, depending upon the operation to be performed. Some of these tables are adjusted manually. Others have complex hydraulic circuits for moving the parts of the table to various positions. In either case, the relative movement of the various parts of the table is limited and the tables are not proportioned in such a way and the top is not so articulated as to be most convenient for the surgeon and most comfortable for the patients, regardless of their size.

In prior tables, a specialized trained person was required to provide the judgment necessary to properly position the patient on the operating table to obtain good anatomical positioning within accepted physiological tolerances.

The present table top is designed to provide anatomical posturing, physiological tolerance, and simplicity. With the present table, any patient of size within the normal adult range is always placed on the table in the same position; that is, with the perineal line of the patient in relation to one point on the table top. The table can then be adjusted to hold the patient in any position, either supine, prone, unilateral, or upright, without further attention to the patient's position. The articulation of the table sections is such that actuation of a single cylinder, the cylinder 87, will move all parts in synchronism through the several anatomical articulations. The other controls are for varying these positions. In carrying out the foregoing, the following major anatomical articulations of the body are considered:
  (1) cervical spine (neck);
  (2) superior lumbar arch (approximately the twelfth thoracic vertebra at the inferior toracic margin);
  (3) articulation of the fifth lumbar and first sacral arch;
  (4) head of the femur and acetabulum; and
  (5) popliteal area (knees).

These articulations divide the body into the said five major regions. For the most advantageous surgical exposure, these five major regions should assume a tolerable anatomical contour appropriate to the particular procedure, with physiologic distribution of body-weight pressure over the table surface. However, it is obviously impossible to conform or "fit" conventional commercial operating tables of but four articulated sections with five major body regions with body articulations between them. Consequent malpositioning of the patient is frequently inevitable with present commercial surgical tables. This serious limitation of present tables often restricts favorable access to the operative site by the surgical team, especially when managing or controlling physiologic deterioration of the patient.

Another major object of this invention is, therefore, to reduce and for the most part avoid these restrictions, and for this purpose we have conceived and evolved an entirely new approach to the problem of providing the surgical team with true postural control of the patient.

In enabling this new technique and other techniques wholly new in this surgical field, the articulating top of the operating table is conformed to the five major surgical regions of the human anatomy. We have provided an adjustable head section directly under the head of the patient; a back or spinal section articulating directly under the lumbar arch and extending to the first thoracic vertebra; a seat or pelvic section with perineal cutout appropriately under the pelvis; a femoral or upper leg section articulating as if from the true hip joints of the patient and extending to the knees thus supporting the thighs; and a lower leg section under the lower legs articulating at the knee joints.

Another object of this invention is, therefore, to provide a table having five sections with articulations between each two adjacent sections whereby each of five major regions of the body may be independently controlled and positioned with the objective of achieving maximum surgical or anatomical exposure, minimal physiological disturbance of the patient and the most convenient application of new surgical techniques which have been developed in recent years.

The differential in the dimensions of the above mentioned five major body regions which embrace the short and tall patient in relation to the table top is immaterial as far as the neck to the top of the head and as far as the knee joints to the feet are concerned. This is true because they are the end sections of the table and they, particularly the lower leg section, can be made long enough to accommodate all patients. Fortunately the variation in pelvic lengths between short and tall adult persons and children in the teen ages is minimal whereas the differential in both the spinal and femoral lengths is extensive. To meet this problem, the thigh section on the table is telescopic or adjustable in length. Thus, we have conceived an operating table that insures true contour correspondence between the articulations of the table and the articulations of human anatomy for adult or teenage patients of a large range of heights.

The foregoing is accomplished by a table top having six sections of suitable width. The entire table is articulated about an anatomical datum line established at the inferior edge of the sacral section, and the patient is placed with his perineal area at this datum line. This is true irrespective of whether the patient is positioned supine, prone, or lateral. This is also true regardless of the height of the majority of patient sizes. It has been discovered that this procedure in design of a table cuts the error of accommodating the table to the sizes of various patients in half.

In addition to the basic premise which has been accomplished in the present invention, the table disclosed herein has hydraulic power controls which control the articulated table top so that each of the sections can be inclined relative to the section to which it is attached, either clockwise or counter-clockwise. A selective control mechanism is provided whereby the table sections can be moved to any relative position of height or angularity by an operator stationed at a single position. The controls are positioned on an arm extending from the table so that the table top sections can be adjusted without disturbing the people standing around the table.

The entire table can be elevated or lowered and can be inclined laterally in either direction from a horizontal position by means of this control. The table is hydraulically controlled and has a mechanical pump bypass which can be used to manually actuate the table in the event of a power failure. The table is explosion proof.

More particularly, it is an object of the present invention to provide a table which overcomes the disadvantages and defects in prior table designs and, more specifically, it is an object to provide a table which is simple in construction, economical to manufacture, and simple and efficient to use.

Another object is to provide an operating table having a top made up of a plurality of articulated sections wherein the table is designed so that a patient can be placed on the table with his body reference to a perineal datum line, regardless of the height of the patient.

Another object is to provide a table having a plurality of sections swingably connected together wherein all of the sections can be disposed in alignment with each other and each of the sections can be swung from said aligned position, either clockwise or counterclockwise, relative to the section to which it is attached.

A further object is to provide an improved actuating mechanism for a table.

Another object is to provide an improved articulation between two sections of a sectionalized table.

An important object of the invention is to provide a surgical table in which most of the major adjustments of the table are accomplished by power as, for example, hydraulically operated, to avoid the manual effort required to raise sections of the table with the weight of the patient thereon.

Another object is to provide a table having a head rest section, a spinal or back section, a lumbar section, a sacral section, a thigh section, and a foot rest section supported on a base wherein the back section and the thigh section are hinged or articulated with respect to the lumbar and sacral sections and movements of the table to the Trendelenburg, reverse Trendelenburg and lateral tilt positions are all controlled by the positioning of the chassis.

Still another object is to provide a table having six sections with articulations between each two adjacent sections whereby each of the six major regions of the body may be independently controlled and positioned with the objective of achieving maximum surgical or anatomical exposure, minimal physiological disturbance of the patient, and the most convenient application of new surgical techniques which have been developed in recent years.

The invention, therefore, has for a further object the provision of a table which is adjustable in length in such a manner that persons of a broad range of heights may be accommodated.

Still another object is to provide a table having a plurality of sections, at least one of the sections being capable of adjustment in length.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

Now with more particular reference to the drawings, the table is made up generally of an articulated top and adjustable pedestal. The pedestal 20 has a base 21 which is vertically adjustable and the top is made up of six articulated flat sections which can be swung to the desired position by hydraulic cylinders acting through the unique linkage best shown in FIGS. 2, 3, 4, and 5. The table sections are conveniently controlled by control unit 198 shown in FIGS. 1 and 22.

Hydraulic cylinders are also provided to raise, lower, and incline the table. Floor jacks are provided to lift the table from the casters and thereby provide a substantially immovable base during surgical procedures.

The arrangement of the cam surfaces and the articulation of links 33, 34, 82 and 94 with table sections 10, 11, 12, 13 and 14 is such that by extending or retracting cylinder 87 by means of the Flex-Deflex control, the table sections can be moved through the usual operation positions. By adjusting the length of the thigh section, the table is adaptable to a wide range of sizes of persons.

*Table top*

The sections are the head section 10, back section 11, lumbar section 12, sacral section 13, thigh (femur) section 14, and foot section 15. The foot section is adjustable from a minimum length to a maximum length. Each section may be provided with suitable accessories.

The table top consists of the six articulated sections swingably connected together. The sections are of suitable width and so proportioned in length and articulation that all adult patients, regardless of size within normal limits, will be comfortably and efficiently positioned by the table.

The ends of the several top sections are rounded where they come together. The sacral and lumbar sections are swingably connected together by an extension on the sacral section at a position spaced from the adjacent ends of the sections. In like manner, the sacral section is connected to the thigh section by means of an extension on the sacral section at a position spaced from the end of the lumbar section. For purposes of this application, the sacral and lumbar sections may be considered to be the pelvic section.

*Head section*

Figure 6:
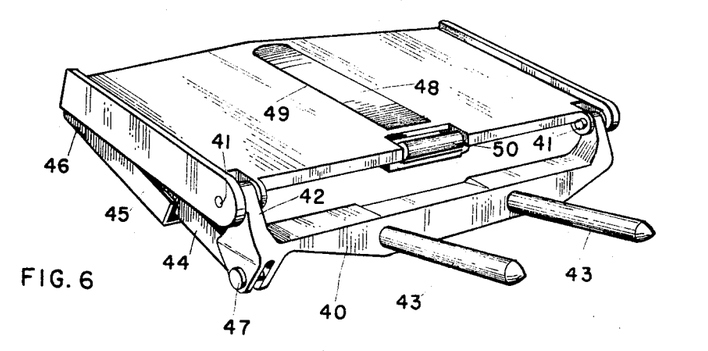
FIGS. 6 and 7 are views of the head section.
Figure 7:
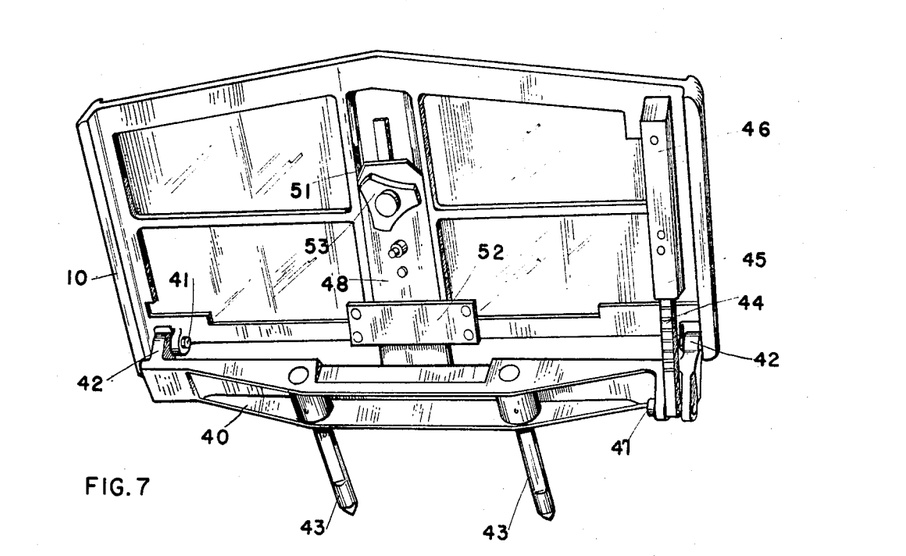

The head section 10 shown in FIGS. 6 and 7 is approximately ten inches long and it may be extended manually by operating a mechanical mechanism to be later described herein. The head section is equipped with a thyroid elevator 48. The head section may be swung from a position of, for instance, thirty degrees above the plane of the back section to a position of, for instance, approximately sixty degrees below the plane of the back section.

The head section is pivotally supported on a bracket 40 by means of pins 41 which extend through ears on the head section 10 through interfitting ears 42 on the bracket 40. The bracket 40 has pins 43 attached thereto and these pins are received in holes in the back section 11 of the table. The bracket 40 is thus held rigidly to the back section 11.

The head section 10 may be tilted relative to the back section by means of the notched lever 44 which is received in a keeper 45. The keeper 45 is swingably attached to the head section at 46 and has a pawl therein to selectively engage the notches in notched lever 44 to hold the head section 10 swung to the desired position relative to the back section. The lever 44 is received between spaced ears and swingably attached to the bracket 40 by means of the pin 47 which passes through both the ears and the lever.

The thyroid elevator 48 is made in the form of a plate like member slidably received in opposed longitudinal rabbeted grooves in the sides of a slot 49 in the head section. The thyroid elevator may slide when the head section is swung down relative to the back section. The top surface of the thyroid elevator 48 is generally flush with the top surface of the head section. The end 50 of the thyroid elevator is curved to form a cylindrical surface on its end so that it will rest against the pad which, in turn, engages the thyroid region of the patient without irritation.

The head section has spaced ribs 51 between which the thyroid elevator slides. It is held in place therein by the keeper plate 52 which spans the space between the ribs 51. A screw is attached to a handle 53. This serves to lock the thyroid elevator in place.

Back section

The back section 11 is approximately fourteen inches long and is independently adjustable by actuation of a link attached thereto. This section is moveable through an angulation of from ninety degrees above a plane passing through the lumbar section 12 to a position approximately thirty degrees below that plane.

The back section is in the form of a flat topped member having a width substantially equal to the width of the head section 10. The back section as well as the other sections may be made with a rigid flat surface suitable to support a pad.

Figures 4, 5:
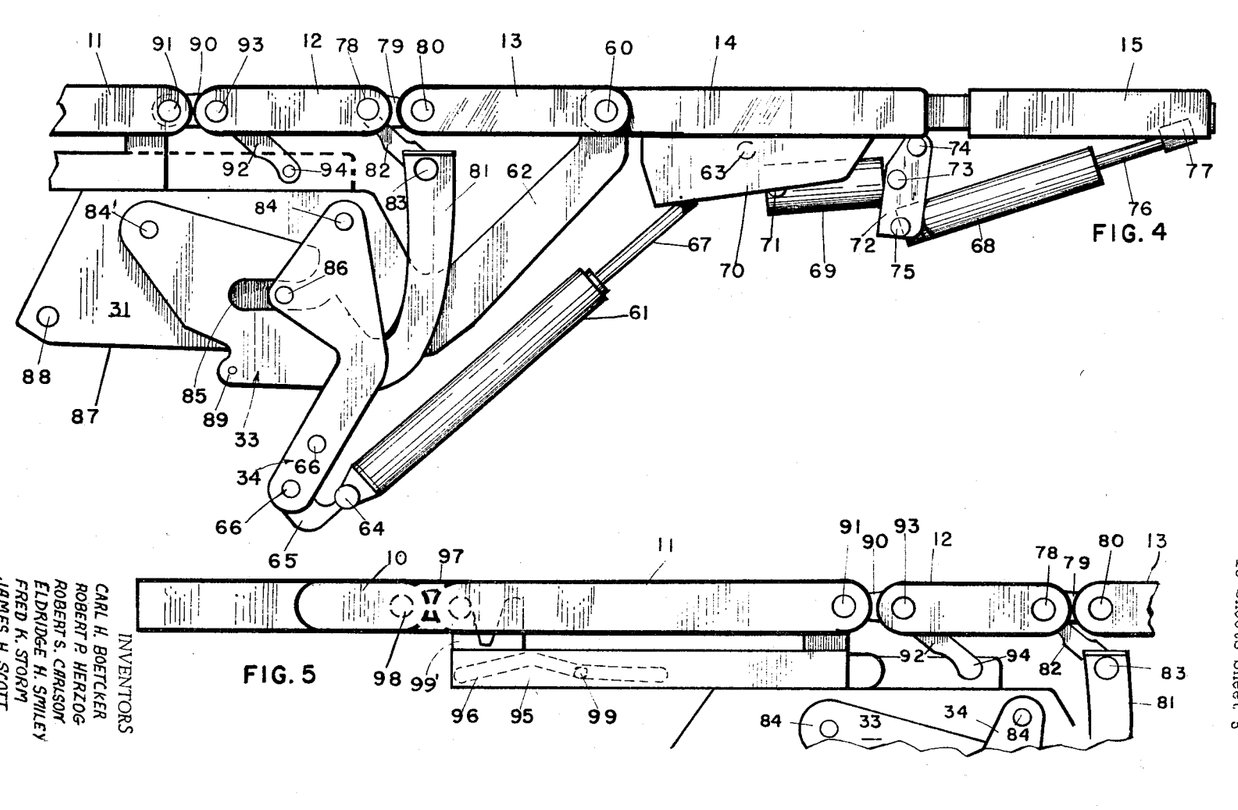
FIG. 4 is a partial side view of the table linkage.
FIG. 5 is a partial side view of the table actuating mechanism.

The back section is swingably connected to the lumbar section 12 by means of the pins 91 which pass through the head end or first end of the lumbar section and through a hole in the outer end of the extension 90 on the adjacent end of the lumbar section. The back section 11 is supported on the chassis 31 by means of rollers 99 on the end of rod 131 which is swingably attached to a plate on the chassis. Cylinder 130 has piston rod 132 pivoted to arm 133 of rod 131. The rollers 99 move in cam slots 96 in member 95 which is fixed to back section 11 at 99' to move the back section 11. In FIG. 5, the head section 10 is shown at or pivoted generally to the back section at 98. One end of cylinder 130 is pivoted to the chassis. The entire chassis can be swung by cylinder 180. Thus, the back section can be swung below or above the plane of the lumbar section by extending or retracting.

Lumbar section

The lumbar section 12 is approximately six inches long. The angulation of this section is approximately thirty degrees above and below the floor line to the flex and deflex position. This lumbar section is swingably connected to the sacral section 13 and to the back section 11. For purposes of this application, the lumbar section and sacral section may be considered to be the pelvic section.

The lumbar section 12 is fixed to the rigid extension 90 and to extension 79. Thus, the extensions 79 and 90 are, in effect, a rigid extension of the lumbar section 12. The extension 79 is pivotally connected to the sacral section 13 at 80. The lumbar control link 92 is pivotally connected to the lumbar section at 93 adjacent extension 90 and pivotally connected to the chassis at 94. Thus, the end of lumbar section 12 having the pivot 93 thereon swings on link 92 about the pivot 94. The back section 11 is carried on rollers 99 along the slot 96. Roller 99 is fixed to piston rod 131. Slot 96 is formed in member 95 which is fixed to the end 97 of the back section 11 by means of the member 99'. Thus, back section 11 and member 99' are rigidly fixed together.

Sacral section

The sacral section 13 is approximately eight inches long. This section works in connection with the lumbar section to form the flex and deflex positions and has an angulation of approximately thirty degrees above and below a line parallel with the floor.

The sacral section 13 is swingably attached to the thigh section 14 and to arm 62 by pin 60 as aforesaid. It is also pivoted to the lumbar section 12 through the extension 79 at 80.

The lumbar section is connected to the upwardly extending arm 81 through sacral control link 82. The sacral control link 82 is pivotally connected to the lumbar section at 78 and to arm 81 of cam plate 33 which is in turn connected to the chassis at 84'.

The cam follower link 34 is made from a plate like member preferably of steel, pivoted to the chassis 31 at 84, and having a curved leg with extension 65 attached to its end. The cam plate 33 is preferably made from a steel plate having a curved arm 81 with pivot 83 at its end. Cam plate 33 has a slot which receives and guides follower 86.

Chassis 31 is preferably made from a heavy steel plate fixed to the side of the table chassis. It has integral arm 62 extending therefrom with pivot 60 at its end.

The cam plate 33 is swingably connected to the chassis 31 at 84' and it has a slot 85 therein that receives a roller follower which is attached to the follower link 34 at 86. Cylinder 87 (FIG. 2) is swingably attached to chassis 31 at 88 and its piston rod is swingably attached to cam plate 33. Thus, when the cam plate 33 is swung by cylinder 87, it acts through sacral control link 82 and swings lumbar section 12 and sacral section 13. Slot 85 receives roller 86. Thus when cam plate 33 moves, it moves follower link 34 in synchronism therewith.

Thigh section

The thigh or femur section 14 is approximately eleven inches long. This section is pivotally connected to the sacral section 13 at 60 which is also the pivotal connection to arm 62 and it is swingably connected to the leg section.

The thigh or femur section has two parts 117 and 118 (FIG. 1) which are telescopically connected together. Part 117 is slid with respect to part 118 by screws 119 attached to part 117. Screws 119 mate with nuts 120 which are attached to part 118. Screws 119 have pinions 121 on their ends which are driven through pinions 122 by crank 123.

The thigh section is controlled by the cylinder 61 having a piston rod 67 which is swingably connected to the thigh section at 63 and swingably connected to extension link 65 which is rigidly fixed to the cam follower link 34 by means of bolts 66. Thus, when the cylinder 61 is extended to move its piston rod 67 outward, the thigh section will swing about the pin at 60.

Foot Section

Figures 16, 20, 21:
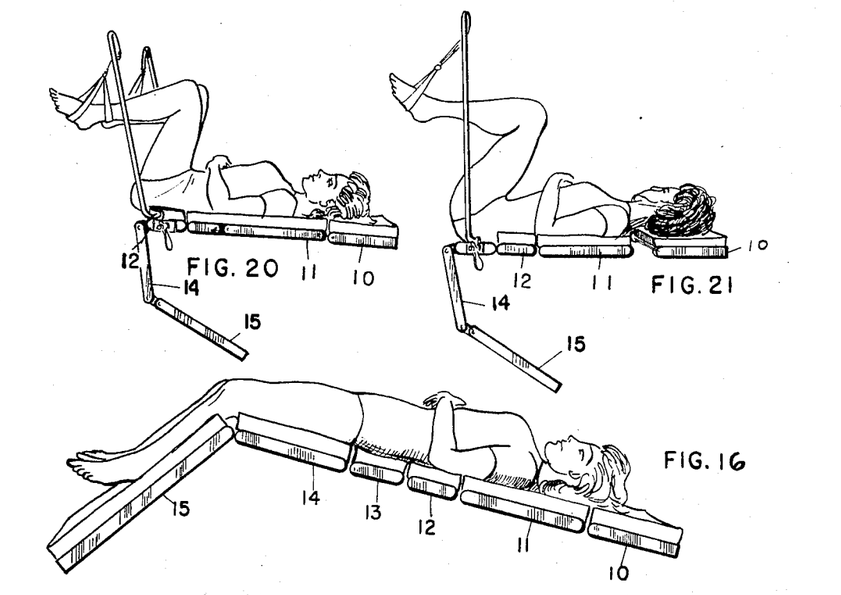
FIGS. 19, 20, and 21 show the table in use with various attachments thereon.
Figures 17, 18, 19:
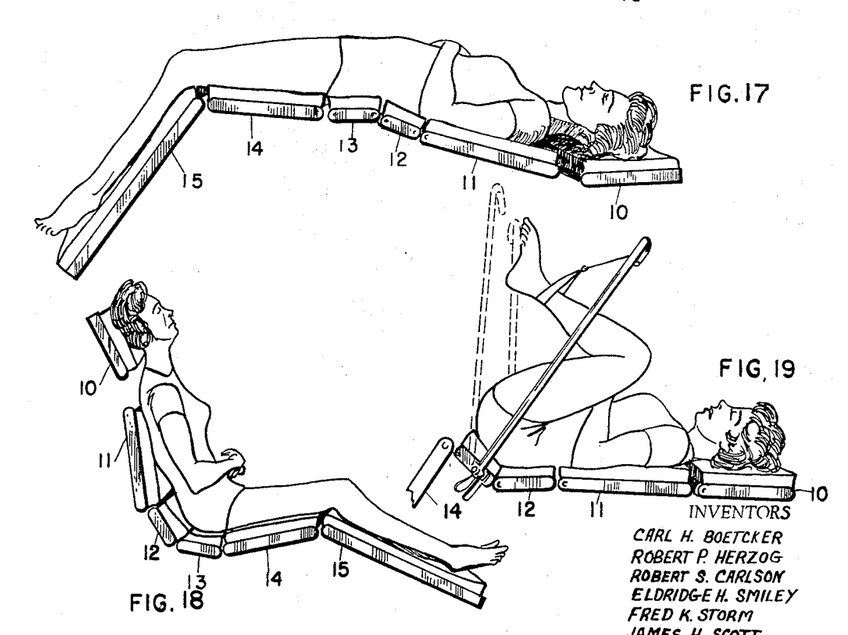

The foot section 15 is approximately eighteen inches long. When desired, the foot section can be tucked away, away, thereby providing the perineal edge of the table completely unobstructed as shown in FIGS. 20 and 21. The lower foot section has a release at the head end of the table for raising it from horizontal.

The foot section is controlled by a compound cylinder arrangement. It can be swung about its pivotal connection to the thigh support 14 by means of either cylinder 68 or cylinder 69. By using both cylinders a greater angle of movement can be accomplished. The cylinder 69 is swingably connected to the bracket plates 70 at 71 and its piston rod is attached to the link 72 at 73. The link 72 is swingably connected to the thigh section 14 at 74. The cylinder 68 is connected to the link 72 at 75 and its piston rod 76 is pivotally connected to the foot section 15 at 77. Thus, cylinders 68 and 69 act in series so to speak; that is, the foot section can be swung by actuating either or both cylinders 68 and 69. Their effect on tilting the foot section relative to the thigh is therefore cumulative and the foot rest can be swung by the two cylinders through a greater angle than it could by means of a single cylinder.

Figures 8, 22:
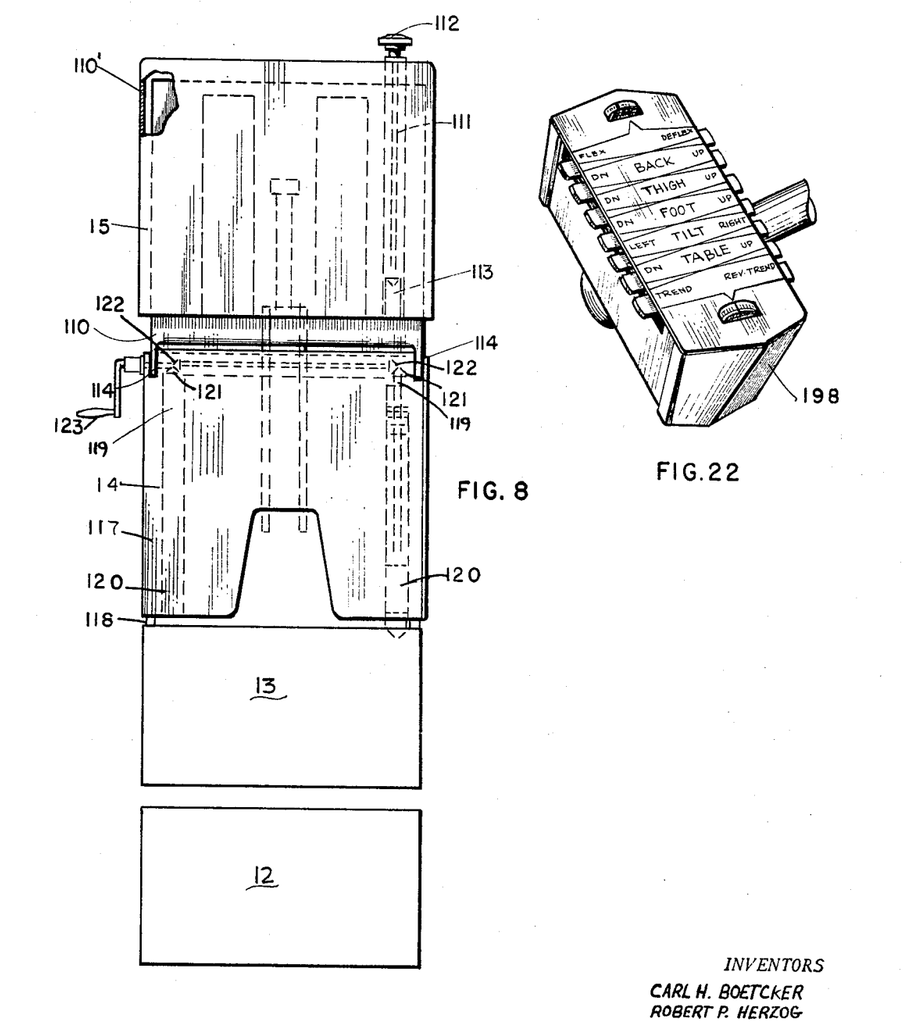
FIG. 8 is a top view of the leg section.
FIG. 22 is an enlarged view of the control unit for the table.
Figure 9:
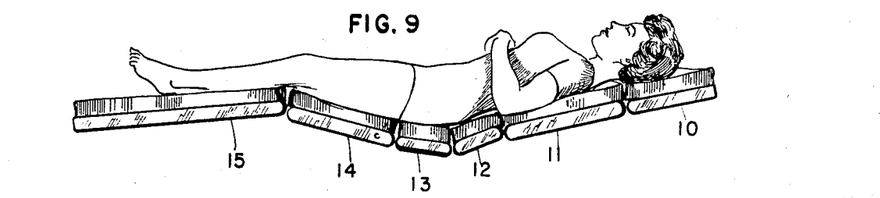
FIGS. 9 to 18 show the table moved to various positions.
Figure 10:
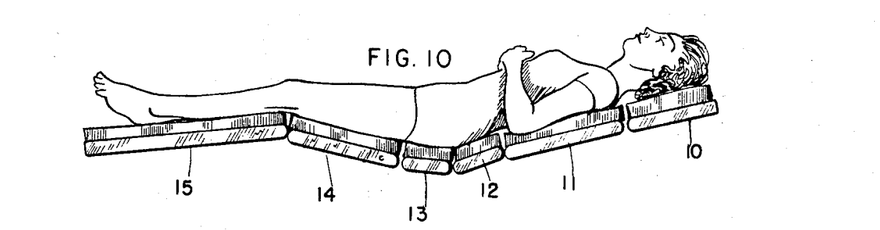
Figure 11:
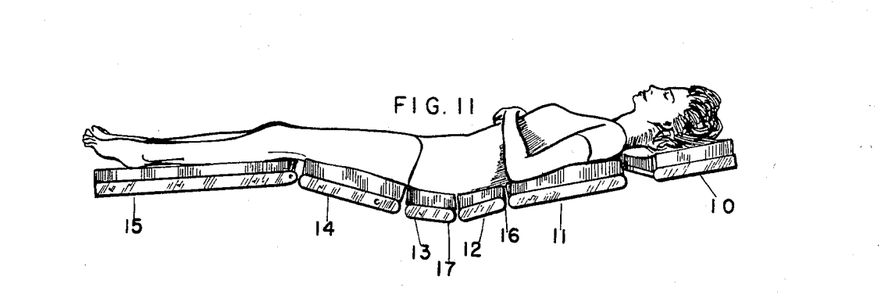
Figure 12:
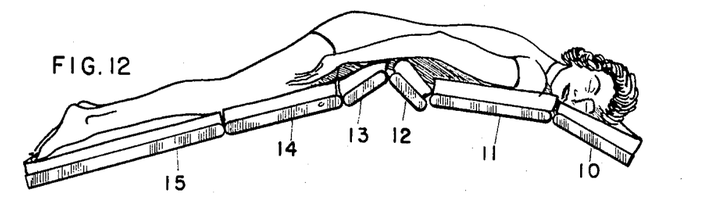
Figure 13:
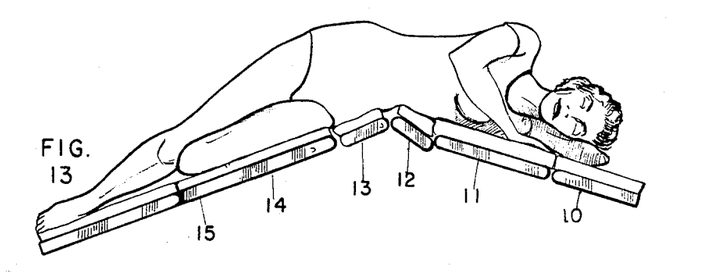
Figure 14:
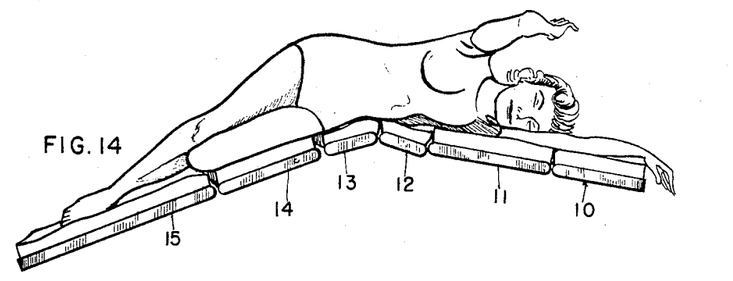
Figure 15:
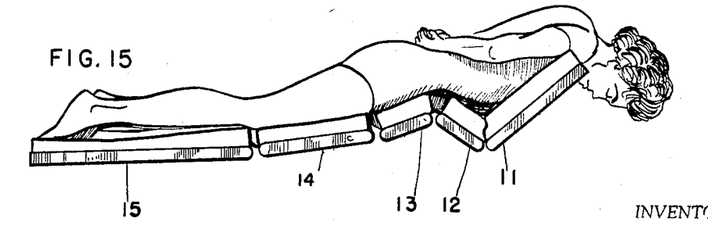

FIG. 8 shows a top view of the foot section which has ears 114 by which it is swingably connected to the thigh section 14. The foot section is made of two parts 110 and 110' telescopically attached together. The parts 110 and 110' can be extended or contracted by means of a lead screw 111 which engages a female threaded member 113 on member 110. A handle 112 is attached to the screw for convenience in operating it. Any suitable lock and slide arrangement could be substituted for the lead screw and threaded member 113.

Pedestal

The pedestal is made up of a base 21 and a column 22 extending upwardly therefrom. The base 21 is made of a heavy steel plate which is supported at its four corners by casters 24. The cylinders 25 have piston rods which can be urged downward to engage the floor and thereby lift the base so that it is supported on the piston rods instead of the casters. These cylinders are actuated by the hydraulic lines 26 which are supplied hydraulic fluid under pressure from the pump and motor arrangement 27. The pump and motor 27 is supported by means of the brackets shown in a slot 29 at the center of the base.

A support plate 132 is fixed to base 21 and below it by means of bolts 133 and held therefrom by spacer tubes 134.

A fixed column 22 extends vertically from the base 21 and has the sliding column 123 telescopically received thereon. The sliding column 123 is made up of two spaced plates, one at each side of the fixed column 22. These fixed plates are held together by bolts 134' which extend through the rollers 28. Thus, the rollers 28 engage the side surfaces of the fixed column and allow the movable column to move upwardly and downwardly smoothly on the fixed column. The sliding column can be moved upward and downward on the fixed column by means of a hydraulic cylinder which is fixed to the fixed column and also to the sliding column.

The chassis 31 is swingably supported on the sub chassis 184 and held in position by cylinder 180. Cylinder 180 is pivotally supported at 181 on brackets 182 which are in turn fixed to the sliding column 123 and go up and down with it. Thus, the entire table can be swung as a unit in a Trendelenburg motion. The sub-chassis 184 is pivotally supported on pedestal 20 at 186. Cylinder 187 is fixed to pedestal 20 at 188 and has a piston rod attached to sub-chassis 184 at a position spaced from the pivot 186. Thus, the table may be tilted laterally by actuating cylinder 187.

The table may thus be adjusted vertically by adjusting the sliding column 123 up or down relative to the fixed column 22.

The table can be swung laterally about the pivot 186 by extending or retracting the piston in cylinder 187. This swings the entire chassis 31 with the control linkage thereon about pivot 186.

The table can be swung to the Trendelenburg position by extending or retracting the piston in cylinder 180. This swings the entire chassis with the table sections and control linkage thereon around a pivot on the sub-chassis 184.

Figure 1:
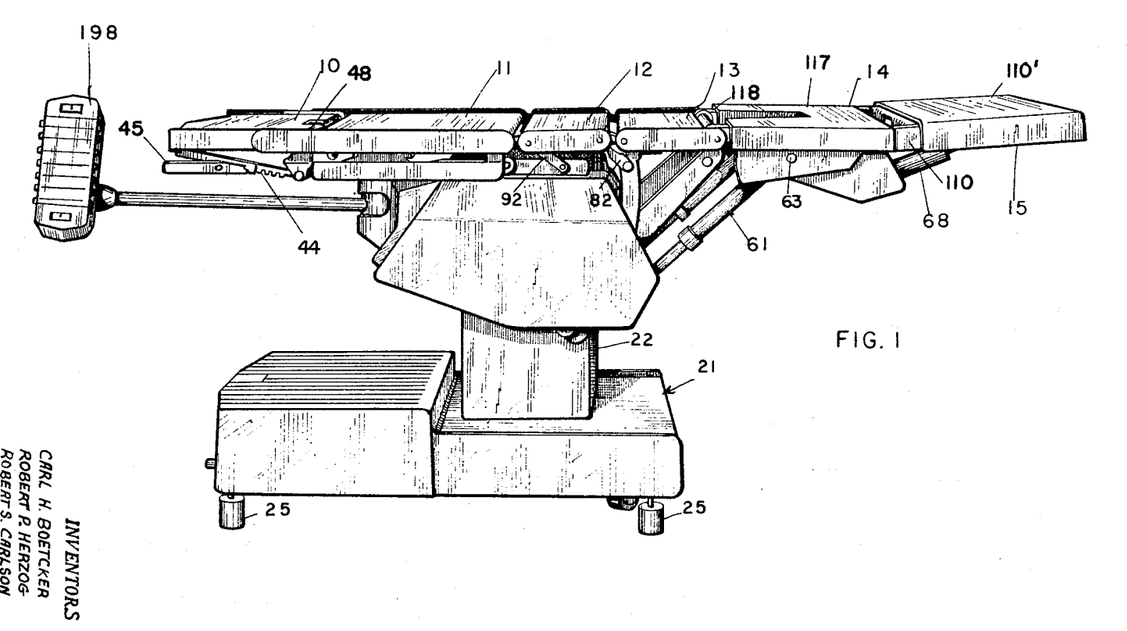
FIGS. 1, 1A, 1B, and 1C are isometric views of a table according to the invention.
Figure 3:
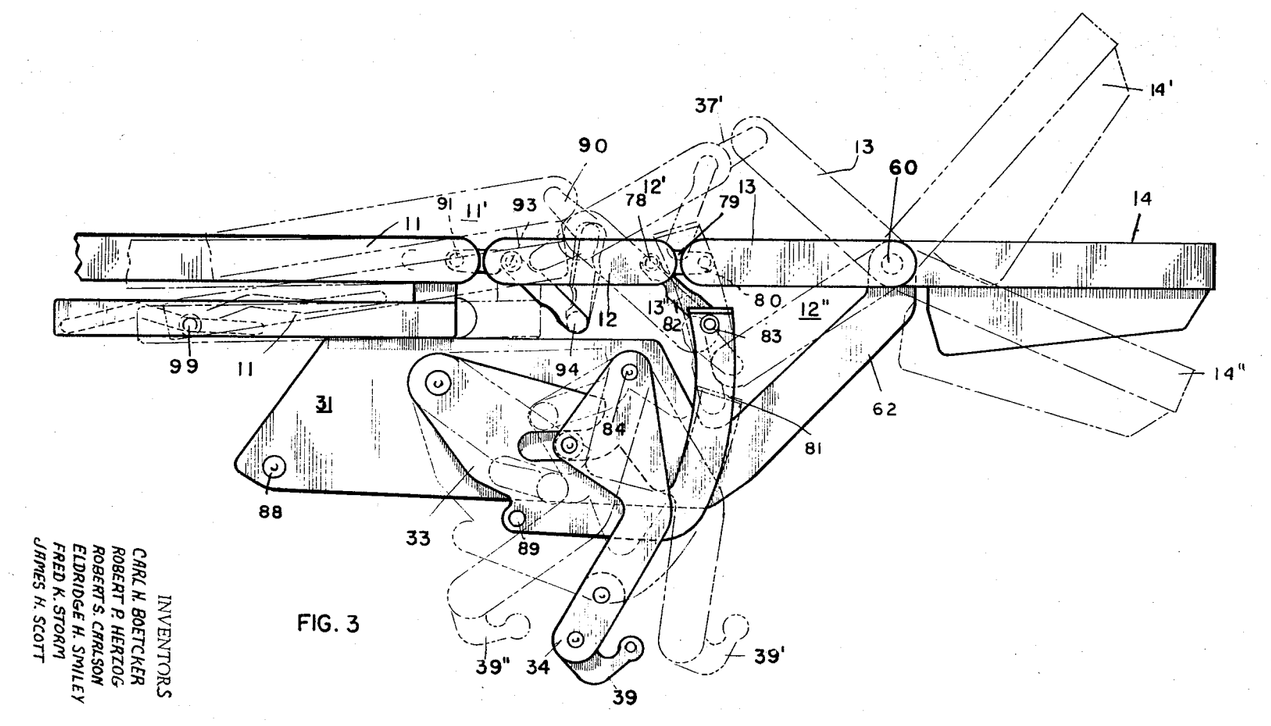
FIG. 3 is a view of the table control linkage.

With the table sections 10–14 in a common plane as shown in FIG. 1 and in the full line position in FIG. 3, and from any other position, the table sections can be swung to a variety of relative positions to suit the requirements of the particular procedure or the desire of the particular surgeon. Because of the articulation of the sections, the patient's body will be properly positioned on the table when once located relative to the perineal reference line.

It will be seen that movement of either the thigh section or sacral section will affect the relative position of each of the back and lumbar sections as well as affecting each other. Examples of the positions these sections may assume are indicated in phantom lines in FIG. 3 at 11', 12', 13', and 14' as well as at 11", 12", 13", and 14". Some of the most usual patient positions are shown in FIGS. 12 to 21.

The table sections can be readily shifted relative to each other by a member of the surgical team positioned away from the table at the control 198. The actuating elements on the control 198 are connected through hydraulic tubing to the corresponding table actuating member. Thus, the "Trend-Rev-Trend" control will be connected to actuate cylinder 180 to move the subchassis and, therefore, the entire table in Trendelenburg and reverse. The "TABLE" actuating member will actuate a cylinder inside the column of the pedestal. The "TILT" actuating member is connected to cylinder 20 to tilt the table either to right or left. The "FOOT" actuating member is connected to cylinders 68 and 69 to move the foot section up or down. The "THIGH" control actuates cylinder 61 to move both the thigh section 14 up and down and, with it, the foot section 15. The "BACK" actuating member is connected to cylinder 130 to actuate the back section. The "Flex-Deflex" actuating member is connected to cylinder 87.

All of these cylinders are double acting. Moving any actuating member to one position will admit fluid under pressure from pump 27 to the respective cylinder to move it in a first direction. Moving the control the other way will admit fluid from the pump to the other side of the cylinder.

Figures 1A, 1B, 1C:
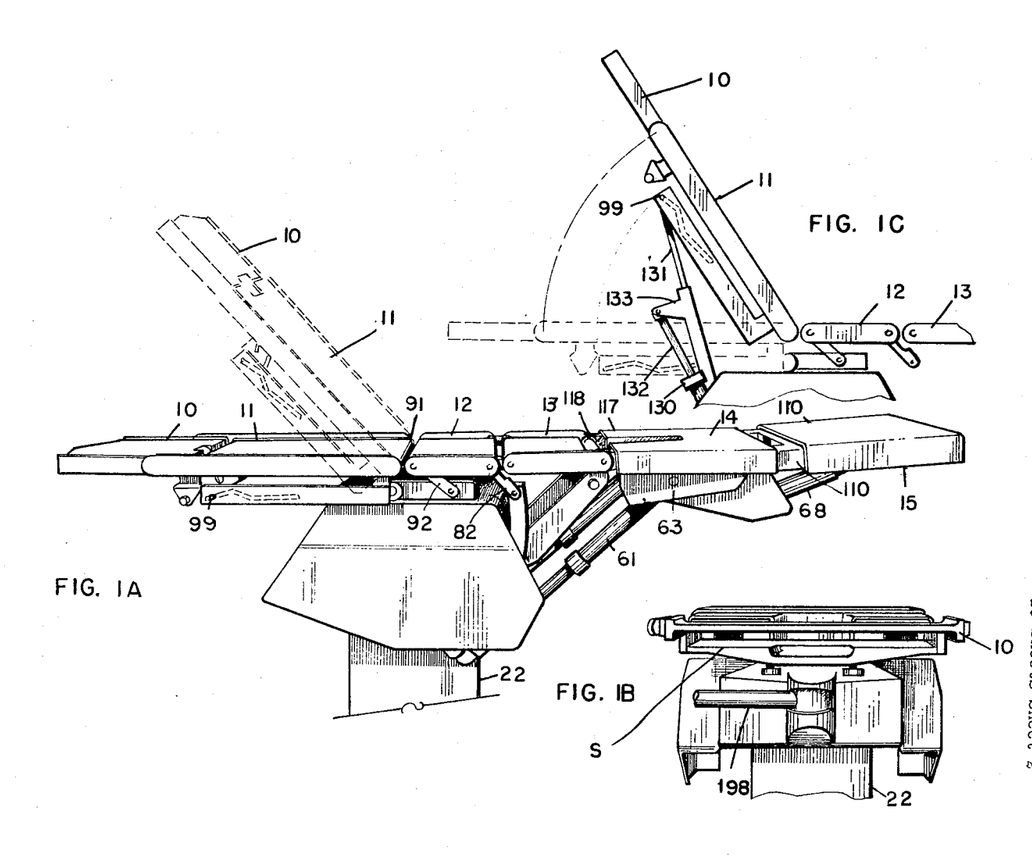
Figure 2:
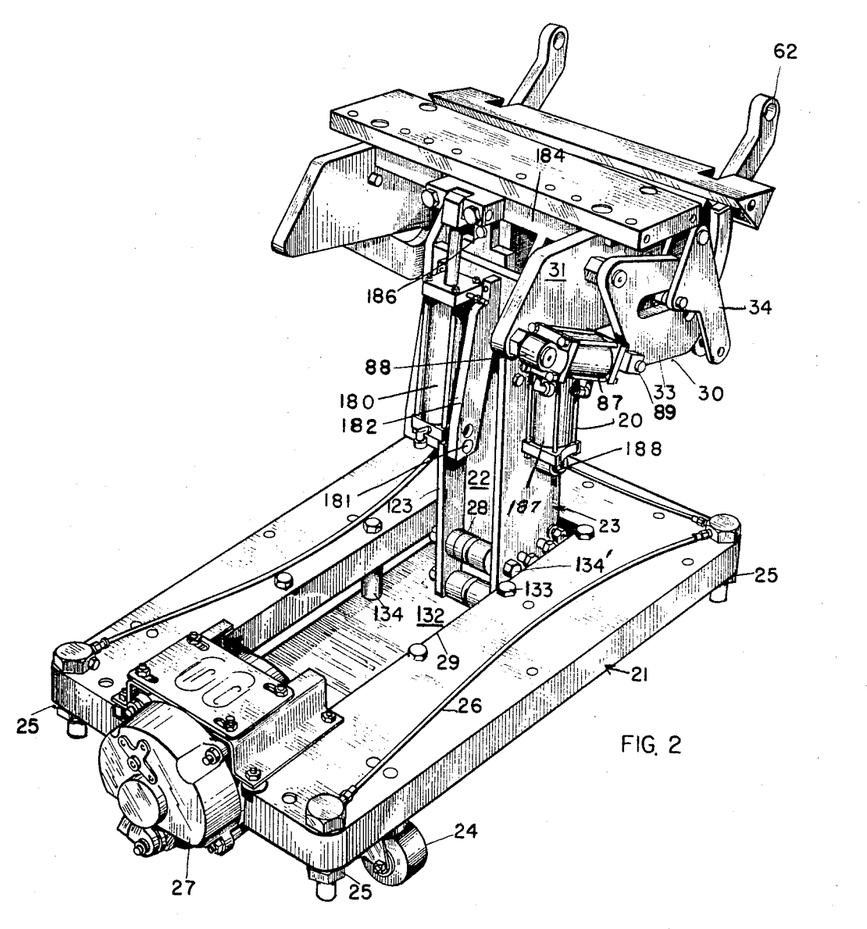
FIG. 2 is an isometric view of the table base.

All of the top sections are spaced above the table framework, as shown in FIG. 1B such that a clear space S is provided below the lower surface of the table sections in which X-ray plates may be arranged. Thus, when the table sections are made of X-ray permeable material, X-rays may be readily taken without disturbing the position of the patient.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A surgical table comprising a head, back, lumbar, sacral, thigh, and foot section swingably connected together at their ends to form a continuous table top adapted to be supported with the tops of said sections in a common plane, and means to swing each said section up or down relative to the other section connected thereto, said lumber and sacral sections being short relative to said back and said thigh sections.

2. The table recited in claim 1 wherein said head section is adjustable in length.

3. A surgical table comprising a table top made of a plurality of sections, each end of each said section being swingably connected to the end of the section adjacent thereto, and means to swing said table sections either up or down relative to each other, said sections being so proportioned that when a patient is placed thereon with the perineal line of his body over a datum line on said table top, his body will be in optimum position to swing said sections relative to each other regardless of the height of said patient.

4. A surgical table comprising a back section, a lumbar section, a sacral section, and a thigh section, said back section being swingably attached to said lumbar section, said lumbar section being swingably attached to said sacral section, said sacral section being swingably attached to said thigh section, means to swing each said section into alignment within the section connected thereto and to swing each said section either up or down from said section to which it is attached, said means to swing said sections relative to each other comprising a chassis, said thigh section and said sacral section being swingably connected to said chassis at the axis about which said thigh section and said sacral section are swingably connected together, a cam plate swingably connected to said chassis at one end and to means attached to said lumbar section at its other end, and means to swing said cam plate to swing said lumbar section and said sacral section relative to each other.

5. The table recited in claim 4, wherein said means connecting said cam plate to said lumbar section comprises a lumbar control link pivotally attached to said chassis at one end thereof and pivotally attached to said lumbar section at a position thereon spaced from said swingable connection to said thigh section.

6. The table recited in claim 5 wherein a sacral control link is provided, said sacral control link being swingably connected to said lumbar section at a position spaced from the position at which said sacral section is attached to said lumbar section.

7. The table recited in claim 5 wherein said means to swing said thigh section comprises a cam link, said cam plate being swingably connected to said chassis at a first end, a part of said cam plate having a follower means thereon, cam means on said cam link engaging said follower means swinging said cam link in relation to the movement of said cam plate, and means on said cam plate spaced from said follower means and from said swingable connection of said cam plate to said chassis connecting said cam plate to said thigh section whereby said thigh section is swung in relation to the movement of said cam plate.

8. The table recited in claim 7 wherein said means connecting said follower link to said thigh section comprises a hydraulic cylinder connected to said cam plate at one end and to said thigh section at the other end.

9. The table recited in claim 7 wherein a foot section is supported on said thigh section, said foot section being extendible to increase the effective length thereof.

10. The table recited in claim 4 wherein said back section is supported on said chassis by means of a cam surface on a member fixed to said back section and a follower means on said chassis engaging said cam surface for moving said back section.

11. A surgical table comprising a top made of a thigh section, a sacral section, a lumbar section, a back section, and a head section swingably connected together, a chassis, a first end of said sacral section and said thigh section being swingably connected together and to said chassis, a second end of said sacral section being swingably connected to a first end of said lumbar section, a foot section, said foot section being swingably connected to said thigh section, a cam plate, said cam plate being swingably attached to said chassis at a first end, means connecting said cam plate to said second end of said sacral section at its second end, means supporting said back section, lumbar section, and foot section swingably connected to said thigh section, means supporting said back section on said chassis for movement thereon, and means on said chassis to swing said cam plate relative to said chassis whereby said sacral section, said lumbar section, and said back section are moved simultaneously.

12. The surgical table recited in claim 11 wherein said means connecting said cam plate to said sacral section comprises a sacral control link, said sacral control link being swingably attached to said cam plate at one end and swingably connected to said sacral section at its other end.

13. The surgical table recited in claim 12 wherein said lumbar section is attached to said chassis by means of a follower control link swingably attached to said chassis at its one end and to said lumbar section at its other end.

14. The table recited in claim 13 wherein a cam follower link is swingably attached to said chassis at its one end, said cam follower link having follower means thereon engaging cam means on said cam plate whereby said cam follower link is swung in synchronism with said cam plate, and means on the distal end of said cam follower link connected to said thigh section at a position spaced from said sacral section for swinging said thigh section in synchronism with said sacral section.

15. The table recited in claim 14 wherein said means for swinging said thigh section comprises a hydraulic cylinder whereby said thigh section is swung about its connection to said sacral section independent of said sacral section.

16. The table recited in claim 13 wherein said back section supporting means comprises cam surface means on said back section and a cam follower swingably supported on said chassis.

17. The table recited in claim 15 wherein a second hydraulic cylinder is connected at one end to said foot section at a position spaced from the connection of said foot section to said thigh section, said second hydraulic cylinder being attached at its other end to a member on said thigh section.

18. The table recited in claim 17 wherein said second hydraulic cylinder is connected to said thigh section by means of a lever, one end of said lever being swingably attached to said thigh section, a part of said lever spaced from said thigh section being attached to said second cylinder, and a third hydraulic cylinder connected to said lever and to said foot section whereby said foot section can be swing by means of said third cylinder acting through said second cylinder.

19. A surgical table or the like comprising, in combination, at least six table sections, said table sections including a head section, a back section, a lumbar section, a sacral section, a thigh section, and a foot section, each end of each said section being swingably connected to the end of the section adjacent thereto and being of such length as to accommodate a person of average height so that the articulation between said head section and the said back section is located substantially at the neck of a person, the articulation between said back section and said lumbar section is located along the back of the person, the articulation between said lumbar section and said sacral section is located adjacent the hips of the person, the articulation between said sacral section and said thigh section is located along the perineal line of the person, and the articulation between said thigh section and said foot section is adjacent the knee joint of the person, and means for articulating said sections.

20. A surgical table or the like comprising, in combination, at least six table sections connected in series, said table sections including a head section, a back section, a lumbar section, a sacral section, a thigh section, and a foot section, said sections being connected by means for articulating said sections with respect to each other, a thyroid cutout in said head section, and a thyroid support slidably supported on said head section and movable to bring to its end to a predetermined position in said thyroid cutout.

21. A surgical table comprising a base, a sub-chassis on said base, means to swing said sub-chassis laterally on said base, a chassis swingably supported on said sub-chassis, Trendelenburg means to swing said chassis axially on said sub-chassis, a back section, cam means supporting said back section on said chassis, a lumbar section connected to said back section at one end, first and second spaced control links, said first link having one end thereof swingably supported on said chassis and its other end swingably attached to said lumbar section, a cam plate swingably attached to said chassis and to said second control link, and means to actuate said second control link.

22. The table recited in claim 21 wherein a sacral section is swingably connected to said lumbar section at one end and to said chassis at its other end.

23. A surgical table comprising a chassis, a back section, a sacral section, one end of said sacral section being swingably connected to said chassis at one end, a lumbar section, an extension on each end of said lumbar section, one said extension being swingably attached to said sacral section, the other said extension being swingably connected to said back section, a first and a second control link, said first control link connecting said lumbar section to said chassis, and lumbar section actuating means on said chassis, said second control link being connected to said lumbar section and said lumbar section actuating means.

24. A surgical table comprising a back section, a lumbar section, a sacral section, and a thigh section, said back section being swingably attached to said lumbar section, said lumbar section being swingably attached to said sacral section, said sacral section being swingably attached to said thigh section, means to swing each said section into alignment with the section connected thereto and to swing each said section either up or down from said section to which it is attached, a foot section swingably attached to said thigh section, means to swing said foot section relative to said thigh section, said means to swing said foot section comprising a link swingably connected to said thigh section, a first hydraulic cylinder connected to said thigh section and to said link to swing said link, and a second hydraulic cylinder connected to said link and to said foot section, said foot section swinging on said thigh section when either or both of said first and said second cylinders are actuated.

References Cited by the Examiner

UNITED STATES PATENTS

| 2,832,655 | 4/1958 | Adolphson | 269—322 |
| 2,989,634 | 6/1961 | Ould et al. | 250—58 |
| 3,041,122 | 6/1962 | Weickgeuannt et al. | 269—325 |

ROBERT C. RIORDON, *Primary Examiner.*

FRANK SUSKO, *Examiner.*

F. J. POWERS, *Assistant Examiner.*